US008855042B2

(12) United States Patent
Yuan et al.

(10) Patent No.: US 8,855,042 B2
(45) Date of Patent: Oct. 7, 2014

(54) DOWNLINK FEEDBACK METHOD FOR TIME DIVISION DUAL SYSTEM AND RELAY LINK THEREOF

(75) Inventors: Ming Yuan, Shenzhen (CN); Feng Bi, Shenzhen (CN); Jin Yang, Shenzhen (CN); Feng Liang, Shenzhen (CN); Shuanshuan Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/641,961

(22) PCT Filed: Jun. 27, 2011

(86) PCT No.: PCT/CN2011/076404
§ 371 (c)(1),
(2), (4) Date: Oct. 18, 2012

(87) PCT Pub. No.: WO2012/041088
PCT Pub. Date: Apr. 5, 2012

(65) Prior Publication Data
US 2013/0286901 A1    Oct. 31, 2013

(30) Foreign Application Priority Data

Sep. 29, 2010   (CN) .......................... 2010 1 0503851

(51) Int. Cl.
| | |
|---|---|
| H04B 7/14 | (2006.01) |
| H04L 1/18 | (2006.01) |
| H04L 5/00 | (2006.01) |
| H04J 3/00 | (2006.01) |
| H04W 84/04 | (2009.01) |
| H04L 1/00 | (2006.01) |
| H04W 72/00 | (2009.01) |
| H04W 72/02 | (2009.01) |
| H04W 28/04 | (2009.01) |

(52) U.S. Cl.
CPC ............ H04L 5/0058 (2013.01); H04L 1/1861 (2013.01); *H04W 84/047* (2013.01); *H04L 1/1812* (2013.01); *H04L 2001/0097* (2013.01); *H04W 72/00* (2013.01); *H04W 72/02* (2013.01); *H04W 28/04* (2013.01); H04L 1/1854 (2013.01)
USPC .......................... 370/315; 370/279; 370/280

(58) Field of Classification Search
None
See application file for complete search history.

(56) References Cited

U.S. PATENT DOCUMENTS

| | | | |
|---|---|---|---|
| 2010/0034135 A1* | 2/2010 | Kim et al. ..................... | 370/315 |
| 2010/0097978 A1* | 4/2010 | Palanki et al. ................ | 370/315 |
| 2011/0110279 A1* | 5/2011 | Li et al. ......................... | 370/280 |
| 2011/0110280 A1* | 5/2011 | Li et al. ......................... | 370/280 |
| 2011/0267992 A1* | 11/2011 | Seo et al. ...................... | 370/279 |

FOREIGN PATENT DOCUMENTS

CN          101790194 A          7/2010

OTHER PUBLICATIONS

Yifei Yuan et-al, "Relay Backhaul Subframe Allocation in LTE-Advanced for TDD", Communications and Networking in China (CHINACOM), 2010 5th International ICST Conference on, Aug. 25-27, 2010 See the whole document.
3GPP R1-102424, "Backhaul Subframe Allocation considering HARQ Timeline", TSG-RAN WG1 Meeting #60b, Beijing, China, Apr. 12-16, 2010 See the whole document.
3GPP R1-102637, "Un HARQ timing for TDD", TSG-RAN WG1 #61, Montreal, Canada, May 10-14, 2010 See the whole document.
International Search Report for PCT/CN2011/076404 dated Sep. 17, 2011.

* cited by examiner

*Primary Examiner* — Clemence Han
(74) *Attorney, Agent, or Firm* — Stephen Yang; Ling Wu; Ling and Yang Intellectual Property

(57) ABSTRACT

The present invention discloses a Time Division Dual (TDD) system and a downlink feedback method for a relay link thereof. A relay station and a network side of the TDD system transmit uplink data and downlink feedback through relay subframes, wherein: one or more uplink subframes are selected from uplink subframes of a wireless frame as uplink relay subframes used for uplink data transmission, a downlink subframe is determined for each uplink relay subframe from downlink subframes of the wireless frame as a downlink relay subframe used for downlink feedback or new data indication, wherein the uplink relay subframes and the downlink relay subframes have a fixed timing sequence relationship; the relay station transmits uplink data to the network side through the uplink relay subframes, and receives the downlink feedback or new data indication from the network side through the downlink relay subframes corresponding to the uplink relay subframes.

12 Claims, 5 Drawing Sheets

DOWNLINK FEEDBACK METHOD FOR TIME DIVISION DUAL SYSTEM AND RELAY LINK THEREOF

TECHNICAL FIELD

The present invention relates to the field of mobile communication, and in particular, to a Time Division Dual (TDD) system and a downlink feedback method for a relay link thereof.

BACKGROUND ART

The requirements of the development of mobile communication are supporting higher transmission rate, more perfect signal coverage and higher resource utilization ratio. The relay technology can improve coverage and balance, and increases cell throughput, and the relay station has a lower configuration cost as compared with the base station, therefore, the relay is considered as a crucial technique in the an evolved Long Term Evolution (LTE) system-LTE-Advanced (LTE-A) system.

In the Time Division Dual (TDD) LTE system, frequency resources are divided by using frame as a unit in terms of time. As shown in FIG. 1, the length of each wireless frame is 10 milliseconds, each wireless frame comprises 10 subframes with a length of 1 millisecond, comprising uplink subframes, downlink subframes and special subframes respectively.

TABLE 1

Uplink and downlink configuration forms of subframes in a TDD LTE system

| Uplink and downlink configuration | Number of subframe | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Depending on different ratios of uplink subframes to downlink subframes, there are totally seven types of subframe configuration structures in the LTE TDD systems, the ratio of uplink subframes to downlink subframes in each configuration structure is different, and the system can configure flexibly according to the service volume in the uplink and downlink in the cell. The specific seven configurations are as shown in Table 1, wherein D denotes a downlink subframe, U denotes an uplink subframe, and S denotes a special subframe. The structure of S subframe is as shown in FIG. 2, comprising a downlink pilot frequency time slot (DwPTS), a gap of protection (GP), and an uplink pilot time slot (UpPTS). As an evolved system of TDD LTE for ensuring backward compatibility, the TDD LTE-A system will retain the same frame structure as the TDD LTE.

HARQ (Hybrid-Automatic Repeat Request) is an important error control method in the packet transmission system, and can efficiently improve transmission reliability. In the LTE/LTE-A system, uplink HARQ transmission defines a series of transmission timing sequences, including: uplink data transmission and downlink Acknowledge/Negative Acknowledge (ACK/NACK) information feedback timing sequences; downlink ACK/NACK feedback and uplink data retransmission timing sequences, etc. Wherein, in the LTE/LTE-A system, uplink data transmission is on the subframe #n, and the corresponding downlink Acknowledge/Negative Acknowledge (ACK/NACK) information feedback is on the subframe #(n+$k_{PHICH}$), wherein the value of $k_{PHICH}$ is determined by the uplink and downlink subframe configuration in the seven types of TDD, as shown in Table 2.

TABLE 2

Value of $k_{PHICH}$ in TDD

| TDD uplink and downlink configuraiton | Uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

As shown in FIG. 3, it shows the architecture of the mobile communication system incorporating the Relay Node (RN). In the mobile communication system, the link between an evolution Node B (eNB) and a relay node is called as a Backhaul Link (also called as a Un Link), the link between a RN and a User Equipment (UE) within its coverage range is called as an Access Link (also called as a Uu Link), and the link between the eNB and the UE within its coverage range is called as a Direct Link. For the eNB, the RN is equivalent to a UE; for the UE, the RN is equivalent to an eNB.

Currently, when the in-band relay mode is adopted, i.e., the Un link and Uu link use the same frequency band, the RN cannot implement transmitting and receiving operations simultaneously on the same frequency resource in order to avoid transmitting and receiving interference of the RN itself. That is, when the RN transmits downlink data to its subordinate UE, it cannot receive downlink data from the eNode-B, or when the RN receives the down link data from the eNode-B, it cannot transmit data to its subordinate UE; similarly, when the RN receives uplink data from its subordinate UE, it cannot transmit uplink data to the base station, or when the RN transmits uplink data to the base station, it cannot receive uplink data from its subordinate UE.

In this case, it needs to set aside a part of the uplink and downlink resources respectively for the eNB-RN communication resource (the corresponding interface is also called as an Un interface), that is, part of subframes are set aside for eNB-RN communication, and these subframes are called as relay subframes (or Un subframes).

For the downlink relay subframe, the relay station indicates to the subordinate Rel-8 UE that it is a MBSFN subframe, and transmits downlink control information to its subordinate UE only in the control domain of the MBSFN subframe, but does not perform any transmission to its subordinate UE in the resources outside the control domain of the MBSFN subframe, thereby ensuring the compatibility of the relay station with the Rel-8 UE when performing downlink receiving, as shown in FIG. 4.

For the uplink relay subframe, the uplink service of the subordinate UE is not scheduled to avoid the UE from performing uplink transmission at the mean time of uplink transmission of the RN. However, in order not to affect the data transmission of the subordinate UE of the RN and to ensure the reliability of transmission between the eNB and RN, it needs to define the uplink HARQ timing sequence of the relay link.

At present, in the 3GPP conference discussion, the discussion on the uplink and downlink HARQ timing sequences of the Un link is very hot, but no consistent view is reached yet.

SUMMARY OF THE INVENTION

The technical problem to be solved in the present invention is to provide a Time Division Dual (TDD) system and a downlink feedback method for a relay link thereof to solve the problem of timing sequence relationship when uplink data transmission and downlink feedback are performed using the relay subframes.

In order to solve the above problem, the present invention provides a downlink feedback method for a relay link in a Time Division Dual (TDD) system, comprising:

selecting one or more uplink subframes from uplink subframes of a wireless frame as uplink relay subframes used for uplink data transmission, determining a downlink subframe for each uplink relay subframe from downlink subframes of the wireless frame as a downlink relay subframe used for downlink feedback or new data indication, wherein the uplink relay subframe and the downlink relay subframe have a fixed timing sequence relationship;

the relay station transmitting uplink data to the network side through the uplink relay subframe, and receiving the downlink feedback or new data indication from the network side through the downlink relay subframe corresponding to the uplink relay subframe according to the fixed timing sequence relationship.

The uplink relay subframe and the downlink relay subframe having a fixed timing sequence relationship means that there is a fixed subframe interval k between the uplink relay subframe and the downlink relay subframe, the downlink relay subframe is the $k^{th}$ subframe after the uplink relay subframe, and a value of k is 4, 5 or 6.

The uplink relay subframe and the downlink relay subframe having the fixed timing sequence relationship therewith are located in a same wireless frame, or the downlink relay subframe is located in a next wireless frame after the wireless frame to which the uplink relay subframe belongs.

The present invention further provides a Time Division Dual (TDD) system, comprising: a relay station, which communicates with a network side through relay subframes, the relay station is configured to transmit uplink data to the network side through an uplink relay subframe, and receive downlink feedback or new data indication from the network side through a downlink relay subframe corresponding to the uplink relay subframe; wherein, the uplink relay subframe is one or more uplink subframes selected from uplink subframes of the wireless frame for uplink data transmission; the downlink relay subframe is a downlink subframe selected from downlink subframes of the wireless frame for downlink feedback or new data indication; each uplink relay subframe corresponds to a downlink relay subframe having a fixed timing sequence relationship therewith.

Wherein, the uplink relay subframe and the downlink relay subframe having a fixed timing sequence relationship means that there is a fixed subframe interval k between the uplink relay subframe and the downlink relay subframe, the downlink relay subframe is the $k^{th}$ subframe after the uplink relay subframe, and a value of k is 4, 5 or 6. The uplink relay subframe and the downlink relay subframe are located in a same wireless frame, or the downlink relay subframe is located in a next wireless frame after the wireless frame to which the uplink relay subframe belongs.

In the above method and system, when the wireless frame adopts the uplink and downlink configuration 1:

if only the uplink subframe #8 is selected as the uplink relay subframe for uplink data transmission, the downlink relay subframe is the downlink subframe #4, or the downlink subframes #4 and #9; wherein: the downlink subframe #4 is taken as the downlink relay subframe having the fixed timing sequence relationship with the uplink subframe #8, wherein the timing sequence interval k=6;

if only the uplink subframe #3 is selected as the uplink relay subframe for uplink data transmission, the downlink relay subframe is the downlink subframe #9, or the downlink subframes #4 and #9; wherein: the downlink subframe #9 is taken as the downlink relay subframe having the fixed timing sequence relationship with the uplink subframe #3, wherein the timing sequence interval k=6;

if the uplink subframes #3 and #8 are selected as the uplink relay subframes for uplink data transmission, the downlink relay subframes are the downlink subframes #4 and #9; wherein, the downlink subframe #4 is taken as the downlink relay subframe having the fixed timing sequence relationship with the uplink subframe #8, and the downlink subframe #9 is taken as the downlink relay subframe having the fixed timing sequence relationship with the uplink subframe #3, wherein the timing sequence interval k=6.

In the above method and system, when the wireless frame adopts the uplink and downlink configuration 2:

if the uplink subframe #2 is taken as the uplink relay subframe used for uplink data transmission, the downlink relay subframe is the downlink subframe(s) #8, or #3 and #8, or #4 and #8, or #9 and #8, or #3, #4 and #8, or #3, #9 and #8, or #4, #9 and #8, or #3, #4, #9 and #8, wherein: the downlink subframe #8 is taken as the downlink relay subframe having the fixed timing sequence relationship with the uplink subframe #2, wherein, the timing sequence interval k=6;

if the uplink subframe #7 is taken as the uplink relay subframe used for uplink data transmission, the downlink relay subframe is the downlink subframe(s) #3, or #3 and #4, or #3 and #8, or #3 and #9, or #3, #4 and #8, or #3, #4 and #9, or #3, #8 and #9, or #3, #4, #8 and #9, wherein: the downlink subframe #3 is taken as the downlink relay subframe having the fixed timing sequence relationship with the uplink subframe #7, wherein, the timing sequence interval k=6;

if the uplink subframes #2 and #7 are taken as the uplink relay subframes used for uplink data transmission, the downlink relay subframes are the downlink subframes #3 and #8, or #3, #4 and #8, or #3, #8 and #9, or #3, #4, #8 and #9, wherein: the downlink subframe #8 is taken as the downlink relay subframe having the fixed timing sequence relationship with the uplink subframe #2, and the downlink subframe #3 is taken as the downlink relay subframe having the fixed timing sequence relationship with the uplink subframe #7, wherein, the timing sequence interval k=6.

In the above method and system, when the wireless frame adopts the uplink and downlink configuration 3:

if the uplink subframe #2 is taken as the uplink relay subframe used for uplink data transmission, the downlink relay subframe is the downlink subframe(s) #8, or #7 and #8, or #8 and #9, or 7, #8 and #9, wherein: the downlink subframe #8 is taken as the downlink relay subframe having the fixed timing sequence relationship with the uplink subframe #2, wherein, the timing sequence interval k=6;

if the uplink subframe #3 is taken as the uplink relay subframe used for uplink data transmission, the downlink relay subframe is the downlink subframe(s) #7, or #8, or #9, or #7 and #8, or #7 and #9, or #8 and #9, or #7, #8 and #9, wherein: the downlink subframe #7 or #8 or #9 is taken as the downlink relay subframe having the fixed timing sequence relationship with the uplink subframe #3, wherein, the timing sequence interval k=4, 5 or 6;

if the uplink subframe #4 is taken as the uplink relay subframe used for uplink data transmission, the downlink relay subframe is the downlink subframe(s) #9, or #7 and #9, or #8 and #9, or #7, #8 and #9, wherein: the downlink subframe #9 is taken as the downlink relay subframe having the fixed timing sequence relationship with the uplink subframe #4, wherein, the timing sequence interval k=5;

if both uplink subframes #2 and #3 are taken as the uplink relay subframes used for uplink data transmission, the downlink relay subframes are downlink subframes #7 and #8, or #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #7 or #9 is taken as the downlink relay subframe having the fixed timing sequence relationship with the uplink subframe #3, and the timing sequence interval k=4 or 6;

if both uplink subframes #2 and #3 are taken as the uplink relay subframes used for uplink data transmission, the downlink relay subframes are the downlink subframes #7 and #9, wherein: the downlink subframe #7 is taken as the downlink relay subframe having the fixed timing sequence relationship with the uplink subframe #2, and the timing sequence interval k=5; the downlink subframe #9 is taken as the downlink relay subframe having the fixed timing sequence relationship with the uplink subframe #3, and the timing sequence interval k=6;

if both uplink subframes #2 and #4 are taken as the uplink relay subframes used for uplink data transmission, the downlink relay subframes are the downlink subframes #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #9 is taken as the downlink relay subframe having the fixed timing sequence relationship with the uplink subframe #4, and the timing sequence interval k=5;

if both uplink subframes #3 and #4 are taken as the uplink relay subframes used for uplink data transmission, the downlink relay subframes are the downlink subframes #7 and #8, wherein: the downlink subframe #7 is taken as the downlink relay subframe having the fixed timing sequence relationship with the uplink subframe #3, and the downlink subframe #8 is taken as the downlink relay subframe having the fixed timing sequence relationship with the uplink subframe #4, and the timing sequence interval k=4;

if both uplink subframes #3 and #4 are taken as the uplink relay subframes used for uplink data transmission, the downlink relay subframes are the downlink subframes #7 and #9, or #8 and #9, or #7, #8 and #9, wherein: the downlink subframe #7 or #8 is taken as the downlink relay subframe having the fixed timing sequence relationship with the uplink subframe #3, and the timing sequence interval k=4 or 5; the downlink subframe #9 is taken as the downlink relay subframe having the fixed timing sequence relationship with the uplink subframe #4, and the timing sequence interval k=5.

In the above method and system, when the wireless frame adopts the uplink and downlink configuration 4:

if only the uplink subframe #2 is taken as the uplink relay subframe for uplink data transmission, the downlink relay subframe is downlink subframe(s) #8, or #4 and #8, or #7 and #8, or #8 and #9, or #4, #7 and #8, or #4, #8 and #9, or #7, #8 and #9, or #4, #7, #8 and #9, wherein: the downlink subframe #8 is taken as the downlink relay subframe having the fixed timing sequence relationship with the uplink subframe #2, wherein the timing sequence interval k=6;

if only the uplink subframe #3 is taken as the uplink relay subframe for uplink data transmission, the downlink relay subframe is the downlink subframe(s) #9, or #4 and #9, or #7 and #9, or #8 and #9, or #4, #7 and #9, or #4, #8 and #9, or #7, #8 and #9, or #4, #7, #8 and #9, wherein: the downlink subframe #9 is taken as the downlink relay subframe having the fixed timing sequence relationship with the uplink subframe #3, wherein the timing sequence interval k=6;

if the uplink subframes #2 and #3 are taken as the uplink relay subframes used for uplink data transmission, the downlink relay subframes are downlink subframes #4, #8 and #9, or #7, #8 and #9, or #4, #7, #8 and #9, wherein: the downlink subframe #8 is taken as the downlink relay subframe having the fixed timing sequence relationship with the uplink subframe #2, and the downlink subframe #9 is taken as the downlink relay subframe having the fixed timing sequence relationship with the uplink subframe #3, wherein the timing sequence interval k=6.

In the above method and system, when the wireless frame adopts the uplink and downlink configuration 6:

if the uplink subframe #4 is taken as the uplink relay subframe used for uplink data transmission, the downlink relay subframe is the downlink subframe #9, and the downlink subframe #9 is taken as the downlink relay subframe having the fixed timing sequence relationship with the uplink subframe #4, wherein the timing sequence interval k=5.

The present invention further provides a relay station, comprising:

a transmitting unit, which is configured to transmit uplink data to a network side through an uplink relay subframe; and a receiving unit, which is configured to receive downlink feedback or new data indication from the network side by a downlink relay subframe corresponding to the uplink relay subframe;

wherein, the uplink relay subframe is one or more uplink subframes selected from uplink subframes of the wireless frame for uplink data transmission; the downlink relay subframe is a downlink subframe selected from downlink subframes of the wireless frame for downlink feedback or new data indication; each uplink relay subframe corresponds to a downlink relay subframe having a fixed timing sequence relationship therewith.

Preferably, in the above relay station, each uplink relay subframe corresponding to a downlink relay subframe having a fixed timing sequence relationship therewith means that each uplink relay subframe corresponds to a downlink relay subframe having a fixed subframe interval k therewith, and the downlink relay subframe is the $k^{th}$ subframe after the uplink relay subframe, and a value of k is 4, 5 or 6.

Preferably, in the above relay station, the uplink relay subframe and the downlink relay subframe are located in a same wireless frame, or the downlink relay subframe is located in a next wireless frame after a wireless frame to which the uplink relay subframe belongs.

Preferably, in the above relay station, when the wireless frame adopts the uplink and downlink configuration 1, if the uplink subframe #8 is taken as the uplink relay subframe for uplink data transmission, the downlink subframe #4 is taken as the downlink relay subframe having the fixed timing sequence relationship therewith, wherein the timing sequence interval k=6; if the uplink subframe #3 is taken as the uplink relay subframe, the downlink subframe #9 is taken as the downlink relay subframe having the fixed timing sequence relationship therewith, wherein the timing sequence interval k=6;

when the wireless frame adopts the uplink and downlink configuration 2, if the uplink subframe #2 is taken as the uplink relay subframe for uplink data transmission, the downlink subframe #8 is taken as the downlink relay subframe having the fixed timing sequence relationship therewith, wherein the timing sequence interval k=6; if the uplink subframe #7 is taken as the uplink relay subframe, the downlink subframe #3 is taken as the downlink relay subframe having the fixed timing sequence relationship therewith, wherein the timing sequence interval k=6;

when the wireless frame adopts the uplink and downlink configuration 3, if the uplink subframe #2 is taken as the uplink relay subframe used for uplink data transmission, the downlink relay subframe is the downlink subframe(s) #8, or #7 and #8, or #8 and #9, or 7, #8 and #9, wherein: the downlink subframe #8 is taken as the downlink relay subframe having the fixed timing sequence relationship with the uplink subframe #2, wherein, the timing sequence interval k=6;

if the uplink subframe #3 is taken as the uplink relay subframe used for uplink data transmission, the downlink relay subframe is the downlink subframe(s) #7, or #8, or #9, or #7 and #8, or #7 and #9, or #8 and #9, or #7, #8 and #9, wherein: the downlink subframe #7 or #8 or #9 is taken as the downlink relay subframe having the fixed timing sequence relationship with the uplink subframe #3, wherein, the timing sequence interval k=4, 5 or 6;

if the uplink subframe #4 is taken as the uplink relay subframe used for uplink data transmission, the downlink relay subframe is the downlink subframe(s) #9, or #7 and #9, or #8 and #9, or #7, #8 and #9, wherein: the downlink subframe #9 is taken as the downlink relay subframe having the fixed timing sequence relationship with the uplink subframe #4, wherein, the timing sequence interval k=5;

if both uplink subframes #2 and #3 are taken as the uplink relay subframes used for uplink data transmission, the downlink relay subframes are the downlink subframes #7 and #8, or #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #7 or #9 is taken as the downlink relay subframe having the fixed timing sequence relationship with the uplink subframe #3, and the timing sequence interval k=4 or 6;

if both uplink subframes #2 and #3 are taken as the uplink relay subframes used for uplink data transmission, the downlink relay subframes are the downlink subframes #7 and #9, wherein: the downlink subframe #7 is taken as the downlink relay subframe having the fixed timing sequence relationship with the uplink subframe #2, and the timing sequence interval k=5; the downlink subframe #9 is taken as the downlink relay subframe having the fixed timing sequence relationship with the uplink subframe #3, and the timing sequence interval k=6;

if both uplink subframes #2 and #4 are taken as the uplink relay subframes used for uplink data transmission, the downlink relay subframes are the downlink subframes #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #9 is taken as the downlink relay subframe having the fixed timing sequence relationship with the uplink subframe #4, and the timing sequence interval k=5;

if both uplink subframes #3 and #4 are taken as the uplink relay subframes used for uplink data transmission, the downlink relay subframes are the downlink subframes #7 and #8, wherein: the downlink subframe #7 is taken as the downlink relay subframe having the fixed timing sequence relationship with the uplink subframe #3, and the downlink subframe #8 is taken as the downlink relay subframe having the fixed timing sequence relationship with the uplink subframe #4, and the timing sequence interval k=4;

if both uplink subframes #3 and #4 are taken as the uplink relay subframes used for uplink data transmission, the downlink relay subframes are the downlink subframes #7 and #9, or #8 and #9, or #7, #8 and #9, wherein: the downlink subframe #7 or #8 is taken as the downlink relay subframe having the fixed timing sequence relationship with the uplink subframe #3, and the timing sequence interval k=4 or 5; the downlink subframe #9 is taken as the downlink relay subframe having the fixed timing sequence relationship with the uplink subframe #4, and the timing sequence interval k=5;

when the wireless frame adopts the uplink and downlink configuration 4, if the uplink subframe #2 is taken as the uplink relay subframe for uplink data transmission, the downlink subframe #8 is taken as the downlink relay subframe having the fixed timing sequence relationship therewith, wherein the timing sequence interval k=6; if the uplink subframe #3 is taken as the uplink relay subframe, the downlink subframe #9 is taken as the downlink relay subframe having the fixed timing sequence relationship therewith, wherein the timing sequence interval k=6;

when the wireless frame adopts the uplink and downlink configuration 6, if the uplink subframe #4 is taken as the uplink relay subframe for uplink data transmission, the downlink subframe #9 is taken as the downlink relay subframe having the fixed timing sequence relationship therewith, wherein the timing sequence interval k=5.

The present invention discloses a Time Division Dual (TDD) system and a downlink feedback method for a relay link thereof, wherein the timing relationship between uplink transmission and downlink feedback in the relay link is configured reasonably, thereby ensuring the uplink data transmission and downlink Acknowledgement/Non-Acknowledgement (ACK/NACK) information feedback timing sequences, improving the reliability of relay link data transmission, guaranteeing the efficiency of HARQ transmission, avoiding the influence on the HARQ timing sequence of the subordinate UE of the relay station, and ensuring the backward compatibility for the terminal.

PREFERRED EMBODIMENTS OF THE INVENTION

Figure 1:
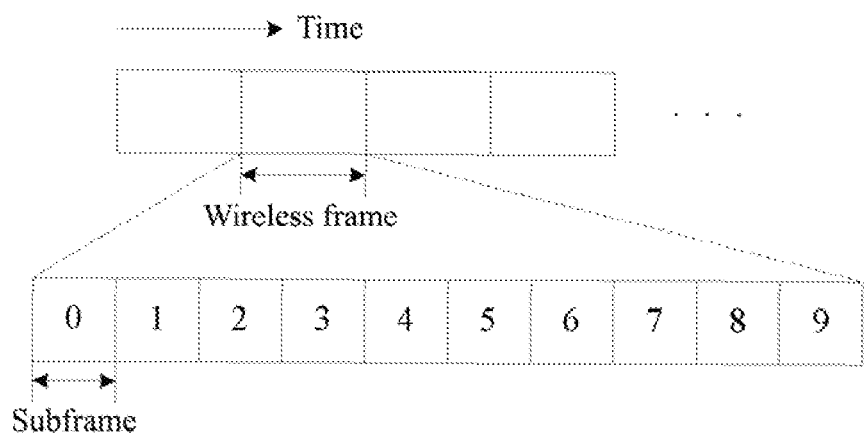
FIG. 1 illustrates the structure of a wireless frame in a LTE system.
Figure 2:
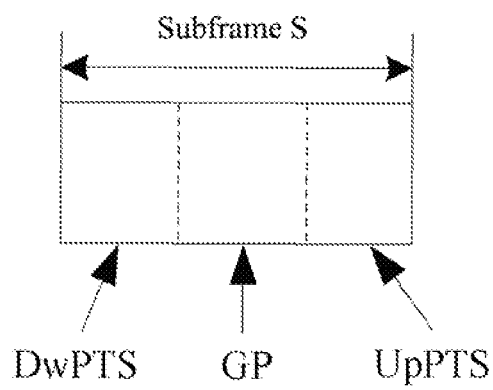
FIG. 2 illustrates the structure of a special subframe in a TDD LTE system.
Figure 3:
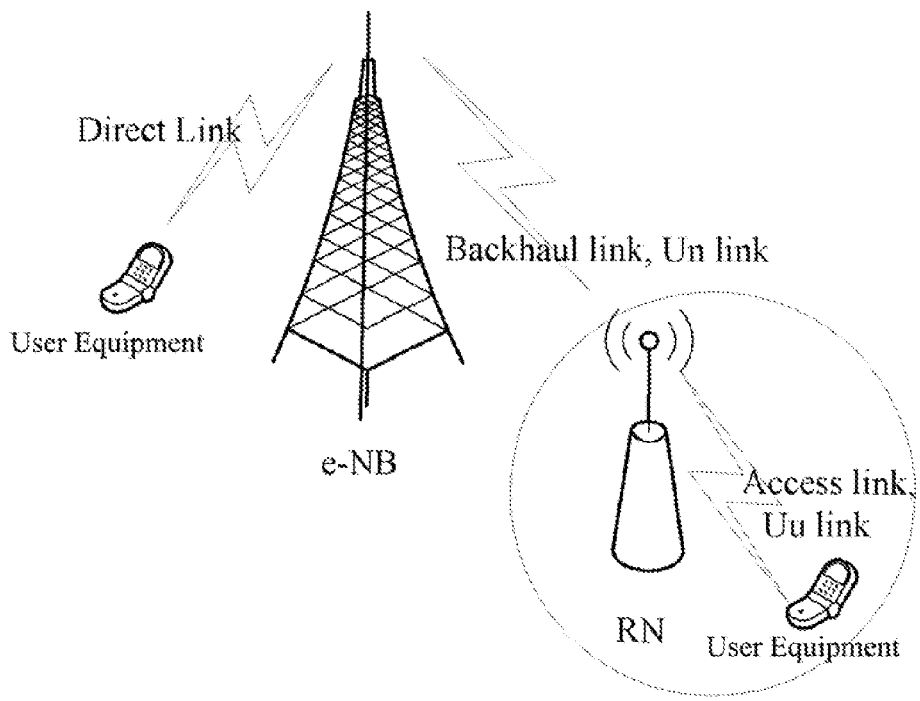
FIG. 3 illustrates the architecture of the LTE system after incorporating a Relay.
Figure 4:
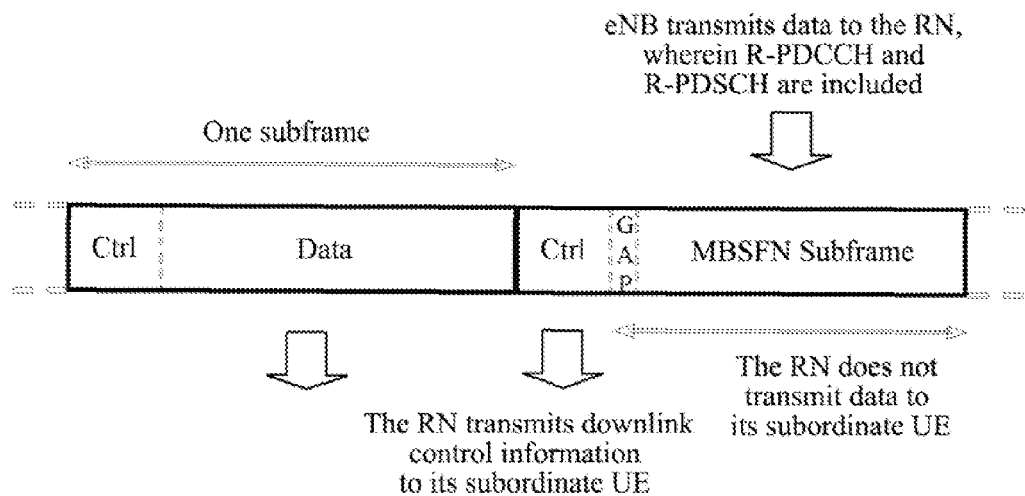
FIG. 4 illustrates the relay subframe transmitting downlink control information in the control domain of the MBSFN subframe.

In order to make the purpose, technical scheme and advantages of the present invention clearer, the present invention will be further described in detail below with reference to the drawings.

Generally, the transmission timing sequences of service data transmission and the corresponding ACK/NACK feedback information need to meet the processing delay. That is, after the receiving end receives the service data, enough processing time is required to perform operations such as demodulation, decoding and Cyclic Redundant Check (CRC) before determining that ACK or NACK information should be fed back to the transmitting end. In the LTE, it is generally considered that this feedback delay is 4 ms at least, i.e., after the subframe m receives data, the feedback is generally implemented at the subframe with the subframe position being greater than or equal to m+4. Therefore, the relay link HARQ timing sequence also needs to comply with this principle. On the other hand, the definition of HARQ timing sequence should consider the feedback delay, i.e., the interval between the service data transmission and the corresponding feedback information transmission shall not be too large, otherwise the delay of service transmission will be caused to increase, thus causing the transmission delay of the subordinate terminal of the relay station to increase.

In the embodiments of the present invention, in order to ensure the downlink feedback of the TDD system, a fixed timing sequence relationship is established between the uplink subframe where the uplink data transmission is located in the relay link and the corresponding downlink subframe for downlink feedback or new data indication, and the timing sequence relationship corresponds to the uplink and downlink subframe configuration of the relay link at the network side one by one; any one or more uplink and downlink subframe configurations of the relay link and the corresponding timing sequence relationships constitute a timing sequence table of the uplink data transmission and downlink feedback or new data indication;

according to the uplink and downlink subframe configuration of the relay link by the network side, the relay station RN can acquire the timing sequence relationship between the uplink data transmission and downlink feedback or new data indication of the corresponding relay link, that is, after the uplink data are transmitted on the uplink subframe of the relay link, the downlink feedback or new data indication is received on the corresponding downlink subframe of the relay link.

The relay station RN performs uplink data transmission on the uplink subframe Un UL subframe #m of the relay link; the network side transmits the downlink feedback or new data indication of the uplink data transmission on the downlink subframe Un DL subframe #m+k of the relay link, where k is a positive integer greater than or equal to 4, preferably k=4, 5 or 6.

As for the uplink and downlink subframes in the wireless frame, one or more uplink subframes can be selected as the uplink relay subframes, and one or more downlink subframes can be selected as the downlink relay subframes, and when one or more uplink relay subframes are used to perform uplink data transmission, it needs to configure a downlink relay subframe used for downlink feedback or new data indication for each uplink relay subframe used for uplink data transmission. In the wireless frame, in addition to the downlink relay subframe for downlink feedback or new data indication, one or more other downlink relay subframes may also be configured. For the wireless frame of each type of the uplink and downlink configuration, multiple types of configuration sets comprising uplink and downlink relay subframes can be formed, and when the network side configures the uplink and downlink subframes in the relay link, one configuration among one or more types of relay link uplink and downlink subframe configuration sets that are appointed by the system can be indicated to the relay station.

How the present invention is implemented under various configuration modes will be described in detail below according to the uplink and downlink configuration modes of the wireless frame in a TDD LTE/LTE-A system in Table 1. Since it is currently determined that relay transmission is not supported in the uplink and downlink subframe configurations 0 and 5 in the TDD LTE Rel-10, the examples of the present invention are only described with reference to other configurations.

Example 1

TDD Uplink and Downlink Subframe Configuration 1: DSUUDDSUUD

Under the TDD uplink and downlink subframe configuration 1, due to the limit of MBSFN subframe configuration, only the downlink subframes #4 and #9 can be configured as the downlink relay subframes, and the uplink subframes #2, #3, #7 and #8 can be configured as the uplink relay subframes.

As for TDD UL/DL configuration #1, the timing sequence of the uplink data transmission and downlink feedback or new data indication is as shown in Table 3:

TABLE 3

| Sub-configuration index | Un DL:UL ratio | Un subframe configurations DL | Un subframe configurations UL | UL subframe index m 0 | 1 | 2 | 3 | 4 | 5 | 6 | 7 | 8 | 9 |
|---|---|---|---|---|---|---|---|---|---|---|---|---|---|
| #0 | 1:1 | 4 | 8 | | | | | | | | | 6 | |
| #1 | | 9 | 3 | | | | 6 | | | | | | |
| #2 | 2:1 | 4, 9 | 8 | | | | | | | | | 6 | |
| #3 | | 4, 9 | 3 | | | | 6 | | | | | | |
| #4 | 2:2 | 4, 9 | 8, 3 | | | | 6 | | | | | | 6 |

Figure 5:
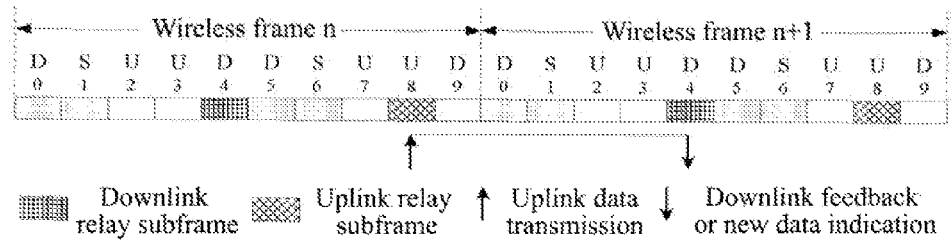
FIG. 5 illustrates the value of k corresponding to #0 subconfiguration when downlink and uplink relay subframe configuration 1:1 under the uplink and downlink subframe configuration 1 of the TDD system provided by an embodiment of the present invention.

(1) When the downlink to uplink relay subframe configuration ratio (Un DL:UL ratio) is 1:1, there are only two possibilities:

When the downlink relay subframe is the subframe #4, and the uplink relay subframe is the subframe #8, the timing sequence of the uplink data transmission and downlink feedback is k=6. That is, the RN performs uplink data transmission on the subframe #8 of the wireless frame n, and receives downlink ACK/NACK feedback corresponding to the uplink data transmission or schedules UL grant of new data on the subframe #4 of the wireless frame (n+1), as shown in FIG. 5.

Figure 6:
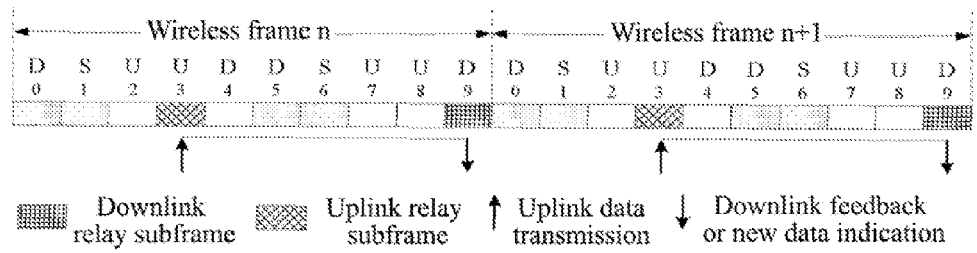
FIG. 6 illustrates the value of k corresponding to #1 subconfiguration when downlink and uplink relay subframe configuration 1:1 under the uplink and downlink subframe configuration 1 of the TDD system provided by an embodiment of the present invention.

When the downlink relay subframe is the subframe #9, and the uplink relay subframe is the subframe #3, the timing sequence of the uplink data transmission and downlink feedback is k=6. That is, the RN performs uplink data transmission on the subframe #3 of the wireless frame n, and receives downlink ACK/NACK feedback corresponding to the uplink data transmission or schedules UL grant of new data on the subframe #9 of the present wireless frame n, as shown in FIG. 6.

Figure 7:
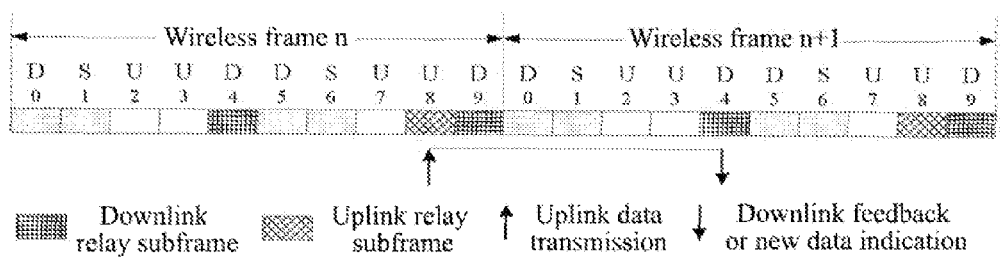
FIG. 7 illustrates the value of k corresponding to #2 sub-configuration when downlink and uplink relay subframe configuration 2:1 under the uplink and downlink subframe configuration 1 of the TDD system provided by an embodiment of the present invention.

(2) When the downlink to uplink relay subframe configuration ratio is 2:1, there are only two possibilities:

When the downlink relay subframes are the subframes #4 and #9, and the uplink relay subframe is the subframe #8, the timing sequence of the uplink data transmission and downlink feedback is k=6. That is, the RN performs uplink data transmission on the subframe #8 of the wireless frame n, and receives downlink ACK/NACK feedback corresponding to the uplink data transmission or schedules UL grant of new data on the subframe #4 of the wireless frame (n+1), as shown in FIG. 7.

Figure 8:
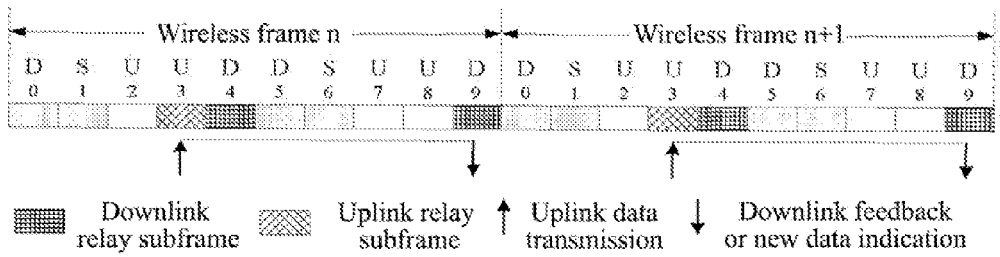
FIG. 8 illustrates the value of k corresponding to #3 sub-configuration when downlink and uplink relay subframe configuration 2:1 under the uplink and downlink subframe configuration 1 of the TDD system provided by an embodiment of the present invention.

When the downlink relay subframes are the subframes #4 and #9, and the uplink relay subframe is the subframe #3, the timing sequence of the uplink data transmission and downlink feedback is k=6. That is, the RN performs uplink data transmission on the subframe #3, and receives downlink ACK/NACK feedback corresponding to the uplink data transmission or schedules UL grant of new data on the subframe #9 of the present wireless frame, as shown in FIG. 8.

Figure 9:
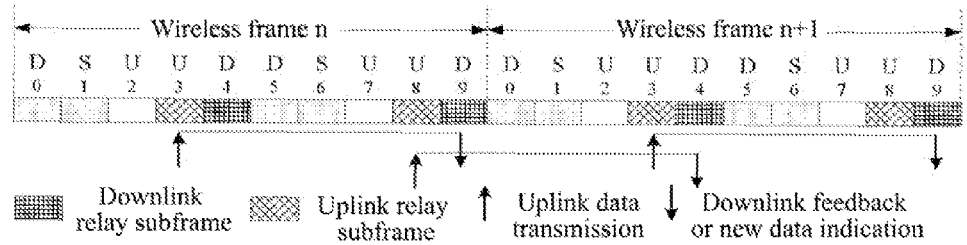
FIG. 9 illustrates the value of k corresponding to #4 sub-configuration when downlink and uplink relay subframe configuration 2:2 under the uplink and downlink subframe configuration 1 of the TDD system provided by an embodiment of the present invention.

(3) When the downlink to uplink relay subframe configuration ratio is 2:2, there are only two possibilities:

When the downlink relay subframes are the subframes #4 and #9, and the uplink relay subframes are the subframes #8 and #3, the timing sequence of the uplink data transmission and downlink feedback is k=6. That is, the RN performs uplink data transmission on the subframe #3, and receives downlink ACK/NACK feedback corresponding to the uplink data transmission or schedules UL grant of new data on the subframe #9 of the present wireless frame; the RN performs uplink data transmission on the subframe #8, and receives downlink ACK/NACK feedback corresponding to the uplink data transmission or schedules UL grant of new data on the subframe #4 of the wireless frame (n+1), as shown in FIG. 9.

With regard to the above timing sequence, it can be concluded that the relay station transmits relay link uplink data on the uplink relay subframe m, and receives corresponding downlink ACK/NAC feedback information or UL grant information of new data on the downlink relay subframe m+k, and the timing sequence interval k=6.

Example 2

TDD Uplink and Downlink Subframe Configuration 2: DSUUDDSUUD

Under the TDD uplink and downlink subframe configuration 2, the downlink subframes #3, #4, #8 and #9 can be configured as the downlink relay subframes, and the uplink subframes #2, and #7 can be configured as the uplink relay subframes. As for the TDD UL/DL configuration #2, the timing sequence of the uplink data transmission and downlink feedback or new data indication is as shown in Table 4:

TABLE 4

| Sub-configurations index | Un DL:UL ratio | Un subframe configurations DL | Un subframe configurations UL | UL subframe index n 0 | 1 | 2 | 3 | 4 | 5 | 6 | 7 | 8 | 9 |
|---|---|---|---|---|---|---|---|---|---|---|---|---|---|
| #0 | 1:1 | 8 | 2 | | | 6 | | | | | | | |
| #1 | | 3 | 7 | | | | | | | | 6 | | |
| #2 | 2:1 | 3, 8 | 2 | | | 6 | | | | | | | |
| #3 | | 4, 8 | 2 | | | 6 | | | | | | | |
| #4 | | 8, 9 | 2 | | | 6 | | | | | | | |
| #5 | | 3, 4 | 7 | | | | | | | | 6 | | |
| #6 | | 3, 8 | 7 | | | | | | | | 6 | | |
| #7 | | 3, 9 | 7 | | | | | | | | 6 | | |
| #8 | 3:1 | 3, 4, 8 | 2 | | | 6 | | | | | | | |
| #9 | | 3, 8, 9 | 2 | | | 6 | | | | | | | |

TABLE 4-continued

| Sub-configurations index | Un DL:UL ratio | Un subframe configurations DL | UL | UL subframe index n 0 | 1 | 2 | 3 | 4 | 5 | 6 | 7 | 8 | 9 |
|---|---|---|---|---|---|---|---|---|---|---|---|---|---|
| #10 | | 4, 8, 9 | 2 | | | 6 | | | | | | | |
| #11 | | 3, 4, 8 | 7 | | | | | | | | 6 | | |
| #12 | | 3, 4, 9 | 7 | | | | | | | | 6 | | |
| #13 | | 3, 8, 9 | 7 | | | | | | | | 6 | | |
| #14 | 4:1 | 3, 4, 8, 9 | 2 | | | 6 | | | | | | | |
| #15 | | 3, 4, 8, 9 | 7 | | | | | | | | 6 | | |
| #16 | 2:2 | 3, 8 | 2, 7 | | | 6 | | | | | 6 | | |
| #17 | 3:2 | 3, 4, 8 | 2, 7 | | | 6 | | | | | 6 | | |
| #18 | | 3, 8, 9 | 2, 7 | | | 6 | | | | | 6 | | |
| #19 | 4:2 | 3, 4, 8, 9 | 2, 7 | | | 6 | | | | | 6 | | |

As for the subframes #2 and #7 used as the uplink relay subframes, one of them can be selected as the uplink relay subframe for uplink data transmission, or both of them are taken as the uplink relay subframes for uplink data transmission. According to different downlink to uplink relay subframe configuration ratios (Un DL:UL ratio) correspondingly, the downlink relay subframe corresponding to the subframe #2 is the downlink subframe #8 in the same wireless frame, while the downlink relay subframe corresponding to the subframe #7 is the downlink subframe #3 in the next wireless frame, and #4 and #9 are used as general downlink relay subframes. According to the above configuration relationship, twenty sub-configurations as shown in Table 4 can be obtained by the combination, each configuration at least comprises one uplink relay subframe for uplink data transmission and the corresponding downlink relay subframe for downlink feedback, and there is a fixed timing sequence relationship between them. Under the uplink and downlink configuration 2, the timing sequence interval in the timing sequence relationship k=6.

Figure 10:
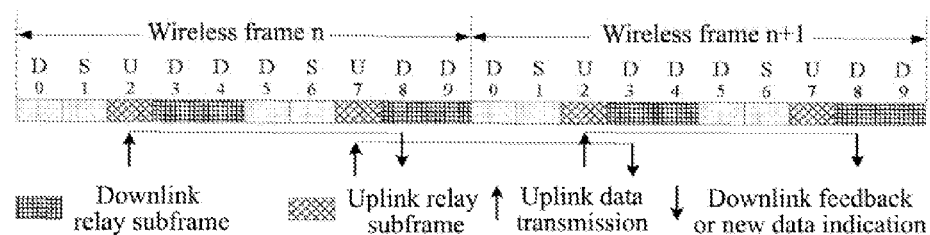
FIG. 10 illustrates the value of k corresponding to #19 sub-configuration when downlink and uplink relay subframe configuration 4:2 under the uplink and downlink subframe configuration 2 of the TDD system provided by an embodiment of the present invention.

As shown in FIG. 10, it is an illustration when the downlink to uplink relay subframe configuration ratio is 4:2, the downlink subframes #3, #4, #8 and #9 are configured as the downlink relay subframes, the uplink subframes #2 and #7 are configured as the uplink relay subframes for uplink data transmission, the downlink relay subframe corresponding to the subframe #2 is the downlink subframe #8 in the same wireless frame, while the downlink relay subframe corresponding to the subframe #7 is the downlink subframe #3 in the next wireless frame, and the timing sequence interval k=6. Subframes #3 and #8 are used to perform downlink feedback and new data indication.

Example 3

TDD Uplink and Downlink Subframe Configuration 3: DSUUUDDDDD

Under the TDD uplink and downlink subframe configuration 3, the downlink subframes #7, #8 and #9 can be configured as the downlink relay subframes, and the uplink subframes #2, #3 and #4 can be configured as the uplink relay subframes. As for the TDD UL/DL configuration #3, the timing sequence of the uplink data transmission and downlink feedback or new data indication is as shown in Table 5:

TABLE 5

| Sub-Configuration index | Un DL:UL ratio | Un subframe configurations DL | UL | UL subframe index n 0 | 1 | 2 | 3 | 4 | 5 | 6 | 7 | 8 | 9 |
|---|---|---|---|---|---|---|---|---|---|---|---|---|---|
| #0 | 1:1 | 8 | 2 | | | 6 | | | | | | | |
| #1 | | 7 | 3 | | | | 4 | | | | | | |
| #2 | | 8 | 3 | | | | 5 | | | | | | |
| #3 | | 9 | 3 | | | | 6 | | | | | | |
| #4 | | 9 | 4 | | | | | 5 | | | | | |
| #5 | 2:1 | 7, 8 | 2 | | | 6 | | | | | | | |
| #6 | | 8, 9 | 2 | | | 6 | | | | | | | |
| #7 | | 7, 8 | 3 | | | | 4 or 5 | | | | | | |
| #8 | | 7, 9 | 3 | | | | 4 or 6 | | | | | | |
| #9 | | 8, 9 | 3 | | | | 6 | | | | | | |
| #10 | | 7, 9 | 4 | | | | | 5 | | | | | |
| #11 | | 8, 9 | 4 | | | | | 5 | | | | | |
| #12 | 3:1 | 7, 8, 9 | 2 | | | 6 | | | | | | | |
| #13 | | 7, 8, 9 | 3 | | | | 4 or 5 or 6 | | | | | | |
| #14 | | 7, 8, 9 | 4 | | | | | 5 | | | | | |
| #15 | 2:2 | 7, 8 | 2, 3 | | | 6 | 4 | | | | | | |
| #16 | | 8, 9 | 2, 3 | | | 6 | 6 | | | | | | |
| #17 | | 7, 9 | 2, 3 | | | 5 | 6 | | | | | | |
| #18 | | 8, 9 | 2, 4 | | | 6 | | 5 | | | | | |
| #19 | | 7, 9 | 3, 4 | | | | 4 | 5 | | | | | |
| #20 | | 8, 9 | 3, 4 | | | | 5 | 5 | | | | | |
| #21 | | 7, 8 | 3, 4 | | | | 4 | 4 | | | | | |
| #22 | 3:2 | 7, 8, 9 | 2, 3 | | | 6 | 4 or 6 | | | | | | |
| #23 | | 7, 8, 9 | 2, 4 | | | 6 | | 5 | | | | | |
| #24 | | 7, 8, 9 | 3, 4 | | | | 4 or 5 | 5 | | | | | |

As for the subframes #2, #3 and #4 used as the uplink relay subframes, one of them can be selected as the uplink relay subframe for uplink data transmission, or both of them are selected as the uplink relay subframes for uplink data transmission. According to different downlink to uplink relay subframe configuration ratios (Un DL:UL ratio) correspondingly, the downlink relay subframe corresponding to the subframe #2 is the downlink subframe #8 in the same wireless frame, in which case k=6; the downlink relay subframe corresponding to the subframe #4 is the downlink subframe #9 in the next wireless frame, in which case k=5; the downlink relay subframe corresponding to the subframe #4 may also be the downlink subframe #8 in the next wireless frame, in which case k=4; as for the uplink subframe #3, one of the downlink subframes #7, #8 and #9 can be selected as the corresponding downlink relay subframe, and the timing sequence interval k in the timing sequence relationship is 4 or 5 or 6 correspondingly.

Various possible configuration combinations will be described in detail below with reference to Table 5. Under the TDD uplink and downlink subframe configuration 3:

If the uplink subframe #2 is taken as the uplink relay subframe used for uplink data transmission, the downlink relay subframe is the downlink subframe(s) #8, or #7 and #8, or #8 and #9, or 7, #8 and #9, wherein: the downlink subframe #8 is taken as the downlink relay subframe having the fixed timing sequence relationship with the uplink subframe #2, wherein, the timing sequence interval k=6;

if the uplink subframe #3 is taken as the uplink relay subframe used for uplink data transmission, the downlink relay subframe is the downlink subframe(s) #7, or #8, or #9, or #7 and #8, or #7 and #9, or #8 and #9, or #7, #8 and #9, wherein: the downlink subframe #7 or #8 or #9 is taken as the downlink relay subframe having the fixed timing sequence relationship with the uplink subframe #3, wherein, the timing sequence interval k=4, 5 or 6;

if the uplink subframe #4 is taken as the uplink relay subframe used for uplink data transmission, the downlink relay subframe is the downlink subframe(s) #9, or #7 and #9, or #8 and #9, or #7, #8 and #9, wherein: the downlink subframe #9 is taken as the downlink relay subframe having the fixed timing sequence relationship with the uplink subframe #4, wherein, the timing sequence interval k=5;

if both uplink subframes #2 and #3 are taken as the uplink relay subframes used for uplink data transmission, the downlink relay subframes are the downlink subframes #7 and #8, or #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #7 or #9 is taken as the downlink relay subframe having the fixed timing sequence relationship with the uplink subframe #3, and the timing sequence interval k=4 or 6;

if both uplink subframes #2 and #3 are taken as the uplink relay subframes used for uplink data transmission, the downlink relay subframes are the downlink subframes #7 and #9, wherein: the downlink subframe #7 is taken as the downlink relay subframe having the fixed timing sequence relationship with the uplink subframe #2, and the timing sequence interval k=5; the downlink subframe #9 is taken as the downlink relay subframe having the fixed timing sequence relationship with the uplink subframe #3, and the timing sequence interval k=6;

if both uplink subframes #2 and #4 are taken as the uplink relay subframes used for uplink data transmission, the downlink relay subframes are the downlink subframes #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #9 is taken as the downlink relay subframe having the fixed timing sequence relationship with the uplink subframe #4, and the timing sequence interval k=5;

if both uplink subframes #3 and #4 are taken as the uplink relay subframes used for uplink data transmission, the downlink relay subframes are the downlink subframes #7 and #8, wherein: the downlink subframe #7 is taken as the downlink relay subframe having the fixed timing sequence relationship with the uplink subframe #3, and the downlink subframe #8 is taken as the downlink relay subframe having the fixed timing sequence relationship with the uplink subframe #4, and the timing sequence interval k=4;

if both uplink subframes #3 and #4 are taken as the uplink relay subframes used for uplink data transmission, the downlink relay subframes are the downlink subframes #7 and #9, or #8 and #9, or #7, #8 and #9, wherein: the downlink subframe #7 or #8 is taken as the downlink relay subframe having the fixed timing sequence relationship with the uplink subframe #3, and the timing sequence interval k=4 or 5; the downlink subframe #9 is taken as the downlink relay subframe having the fixed timing sequence relationship with the uplink subframe #4, and the timing sequence interval k=5.

Figure 11:
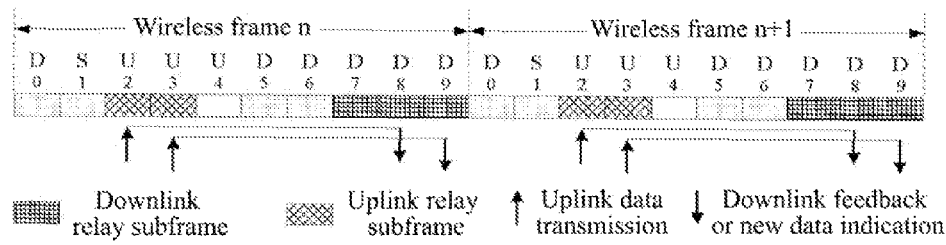
FIG. 11 illustrates the value of k corresponding to #22 sub-configuration when downlink and uplink relay subframe configuration 3:2 under the uplink and downlink subframe configuration 3 of the TDD system provided by an embodiment of the present invention.

As shown in FIG. 11, it is an illustration when the downlink to uplink relay subframe configuration ratio is 3:2 and the sub-configuration is #22 in Table 5, the downlink subframes #8 and #9 are configured as the downlink relay subframes, the uplink subframes #2 and #3 are configured as the uplink relay subframes for uplink data transmission, the downlink relay subframe corresponding to the subframe #2 is the downlink subframe #8 in the same wireless frame, while the downlink relay subframe corresponding to the subframe #3 is the downlink subframe #9 in the same wireless frame, and the timing sequence interval k=6. The subframes #8 and #9 are used to perform downlink feedback and new data indication.

Example 4

TDD Uplink and Downlink Subframe Configuration 4: DSUUDDDDDD

Under the TDD uplink and downlink subframe configuration 4, the downlink subframes #4, #7, #8 and #9 can be configured as the downlink relay subframes, and the uplink subframes #2, and #3 can be configured as the uplink relay subframes.

As for the TDD UL/DL configuration #4, the timing sequence of the uplink data transmission and downlink feedback or new data indication is as shown in Table 6:

TABLE 6

| Sub-configurations | Un DL:UL ratio | Un subframe configurations | | UL subframe index n | | | | | | | | | |
|---|---|---|---|---|---|---|---|---|---|---|---|---|---|
| | | DL | UL | 0 | 1 | 2 | 3 | 4 | 5 | 6 | 7 | 8 | 9 |
| #0 | 1:1 | 8 | 2 | | | 6 | | | | | | | |
| #1 | | 9 | 3 | | | | 6 | | | | | | |
| #2 | 2:1 | 4, 8 | 2 | | | 6 | | | | | | | |

TABLE 6-continued

| Sub-configurations | Un DL:UL ratio | Un subframe configurations DL | UL | UL subframe index n 0 | 1 | 2 | 3 | 4 | 5 | 6 | 7 | 8 | 9 |
|---|---|---|---|---|---|---|---|---|---|---|---|---|---|
| #3 | | 7, 8 | 2 | | | 6 | | | | | | | |
| #4 | | 8, 9 | 2 | | | 6 | | | | | | | |
| #5 | | 4, 9 | 3 | | | | | 6 | | | | | |
| #6 | | 7, 9 | 3 | | | | | 6 | | | | | |
| #7 | | 8, 9 | 3 | | | | | 6 | | | | | |
| #8 | 3:1 | 4, 7, 8 | 2 | | | 6 | | | | | | | |
| #9 | | 4, 8, 9 | 2 | | | 6 | | | | | | | |
| #10 | | 7, 8, 9 | 2 | | | 6 | | | | | | | |
| #11 | | 4, 7, 9 | 3 | | | | | 6 | | | | | |
| #12 | | 4, 8, 9 | 3 | | | | | 6 | | | | | |
| #13 | | 7, 8, 9 | 3 | | | | | 6 | | | | | |
| #14 | 4:1 | 4, 7, 8, 9 | 2 | | | 6 | | | | | | | |
| #15 | | 4, 7, 8, 9 | 3 | | | | | 6 | | | | | |
| #16 | 3:2 | 4, 8, 9 | 2, 3 | | | 6 | | 6 | | | | | |
| #17 | | 7, 8, 9 | 2, 3 | | | 6 | | 6 | | | | | |
| #18 | 4:2 | 4, 7, 8, 9 | 2, 3 | | | 6 | | 6 | | | | | |

As for the subframes #2, and #3 used as the uplink relay subframes, one of them can be selected as the uplink relay subframe for uplink data transmission, or both of them are selected as the uplink relay subframes for uplink data transmission. According to different downlink to uplink relay subframe configuration ratios (Un DL:UL ratio) correspondingly, the downlink relay subframe corresponding to the subframe #2 is the downlink subframe #8 in the same wireless frame, while the downlink relay subframe corresponding to the subframe #3 is the downlink subframe #9 in the next wireless frame, and #4 and #7 are used as general downlink relay subframes. According to the above configuration relationship, nineteen sub-configurations as shown in Table 5 can be obtained by the combination, each configuration at least comprises one uplink relay subframe for uplink data transmission and the corresponding downlink relay subframe for downlink feedback, and there is a fixed timing sequence relationship between them. Under the uplink and downlink configuration 4, the timing sequence interval in the timing sequence relationship k=6.

Figure 12:
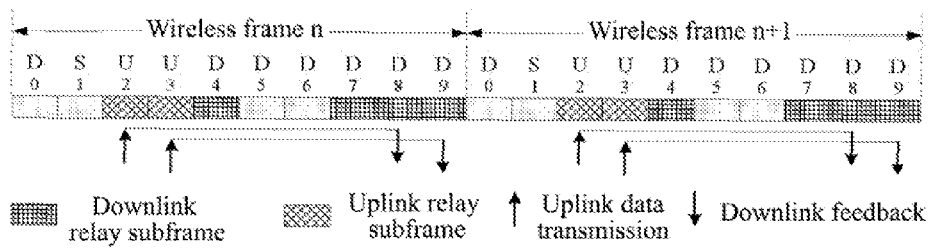
FIG. 12 illustrates the value of k corresponding to #18 sub-configuration when downlink and uplink relay subframe configuration 4:2 under the uplink and downlink subframe configuration 4 of the TDD system provided by an embodiment of the present invention.

As shown in FIG. 12, it is an illustration when the downlink to uplink relay subframe configuration ratio is 4:2, corresponding to the sub-configuration #18 in Table 6. The downlink subframes #4, #7, #8 and #9 are configured as the downlink relay subframes, the uplink subframes #2 and #3 are configured as the uplink relay subframes for uplink data transmission, the downlink relay subframe corresponding to the subframe #2 is the downlink subframe #8 in the same wireless frame, while the downlink relay subframe corresponding to the subframe #3 is the downlink subframe #9 in the same wireless frame, and the timing sequence interval k=6. The subframes #8 and #9 are used to perform downlink feedback and new data indication, while the subframes #4 and #7 are only used as general downlink relay subframes, rather than performing downlink feedback or new data indication.

Example 5

TDD Uplink and Downlink Subframe Configuration 6: DSUUUDSUUD

Under the TDD uplink and downlink subframe configuration 6, the downlink subframe #9 can be configured as the downlink relay subframe, and the uplink subframes #4 can be configured as the uplink relay subframe.

As for the TDD UL/DL configuration #6, the timing sequence of the uplink data transmission and downlink feedback or new data indication is as shown in Table 7:

TABLE 7

| Sub-Configuration | Un DL:UL ratio | Un subframe configurations DL | UL | UL subframe index n 0 | 1 | 2 | 3 | 4 | 5 | 6 | 7 | 8 | 9 |
|---|---|---|---|---|---|---|---|---|---|---|---|---|---|
| #0 | 1:1 | 9 | 4 | | | | | 5 | | | | | |

Figure 13:
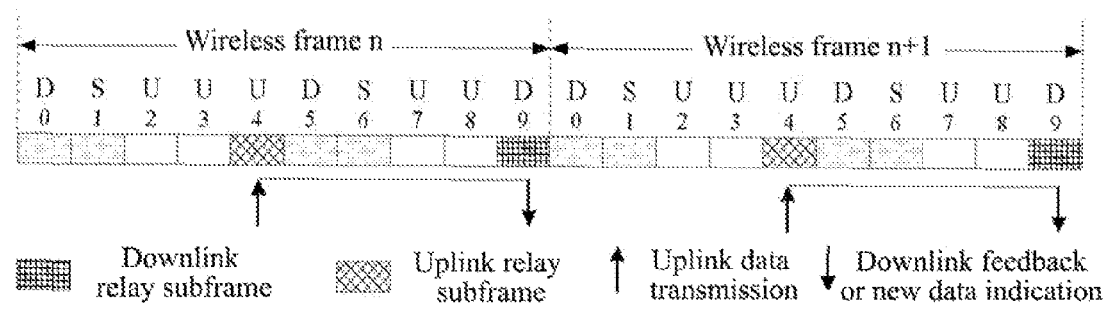
FIG. 13 illustrates the value of k corresponding to #0 sub-configuration when downlink and uplink relay subframe configuration 1:1 under the uplink and downlink subframe configuration 6 of the TDD system provided by an embodiment of the present invention.

In table 7, the downlink relay subframe corresponding to the subframe #4 is downlink subframe #9 in the same wireless frame, in which case the timing sequence interval k=5, as shown in FIG. 13.

A relay station is further provided in the embodiment of the present invention, wherein the relay transmission is implemented using the above method, and the relay station comprises:

a transmitting unit, which is configured to transmit uplink data to a network side by an uplink relay subframe; and a receiving unit, which is configured to receive downlink feedback or new data indication from the network side by a downlink relay subframe corresponding to the uplink relay subframe;

wherein, the uplink relay subframe is one or more uplink subframes selected from uplink subframes of the wireless frame for uplink data transmission; the downlink relay subframe is a downlink subframe selected from downlink subframes of the wireless frame for downlink feedback or new data indication; each uplink relay subframe corresponds to a downlink relay subframe having a fixed timing sequence relationship therewith.

Preferably, in the above relay station, each uplink relay subframe corresponding to a downlink relay subframe having a fixed timing sequence relationship therewith means that each uplink relay subframe corresponds to a downlink relay subframe having a fixed subframe interval k therewith, and the downlink relay subframe is the $k^{th}$ subframe after the uplink relay subframe, and a value of k is 4, 5 or 6.

Preferably, in the above relay station, the uplink relay subframe and the downlink relay subframe are located in a same wireless frame, or the downlink relay subframe is located in a next wireless frame after a wireless frame to which the uplink relay subframe belongs.

Preferably, in the above relay station, when the wireless frame adopts the uplink and downlink configuration 1, if the uplink subframe #8 is taken as the uplink relay subframe for uplink data transmission, the downlink subframe #4 is taken as the downlink relay subframe having the fixed timing sequence relationship therewith, wherein the timing sequence interval k=6; if the uplink subframe #3 is taken as the uplink relay subframe, the downlink subframe #9 is taken as the downlink relay subframe having the fixed timing sequence relationship therewith, wherein the timing sequence interval k=6;

when the wireless frame adopts the uplink and downlink configuration 2, if the uplink subframe #2 is taken as the uplink relay subframe for uplink data transmission, the downlink subframe #8 is taken as the downlink relay subframe having the fixed timing sequence relationship therewith, wherein the timing sequence interval k=6; if the uplink subframe #7 is taken as the uplink relay subframe, the downlink subframe #3 is taken as the downlink relay subframe having the fixed timing sequence relationship therewith, wherein the timing sequence interval k=6;

when the wireless frame adopts the uplink and downlink configuration 3, if the uplink subframe #2 is taken as the uplink relay subframe used for uplink data transmission, the downlink relay subframe is the downlink subframe(s) #8, or #7 and #8, or #8 and #9, or 7, #8 and #9, wherein: the downlink subframe #8 is taken as the downlink relay subframe having the fixed timing sequence relationship with the uplink subframe #2, wherein, the timing sequence interval k=6;

if the uplink subframe #3 is taken as the uplink relay subframe used for uplink data transmission, the downlink relay subframe is the downlink subframe(s) #7, or #8, or #9, or #7 and #8, or #7 and #9, or #8 and #9, or #7, #8 and #9, wherein: the downlink subframe #7 or #8 or #9 is taken as the downlink relay subframe having the fixed timing sequence relationship with the uplink subframe #3, wherein, the timing sequence interval k=4, 5 or 6;

if the uplink subframe #4 is taken as the uplink relay subframe used for uplink data transmission, the downlink relay subframe is the downlink subframe(s) #9, or #7 and #9, or #8 and #9, or #7, #8 and #9, wherein: the downlink subframe #9 is taken as the downlink relay subframe having the fixed timing sequence relationship with the uplink subframe #4, wherein, the timing sequence interval k=5;

if both uplink subframes #2 and #3 are taken as the uplink relay subframes used for uplink data transmission, the downlink relay subframes are the downlink subframes #7 and #8, or #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #7 or #9 is taken as the downlink relay subframe having the fixed timing sequence relationship with the uplink subframe #3, and the timing sequence interval k=4 or 6;

if both uplink subframes #2 and #3 are taken as the uplink relay subframes used for uplink data transmission, the downlink relay subframes are the downlink subframes #7 and #9, wherein: the downlink subframe #7 is taken as the downlink relay subframe having the fixed timing sequence relationship with the uplink subframe #2, and the timing sequence interval k=5; the downlink subframe #9 is taken as the downlink relay subframe having the fixed timing sequence relationship with the uplink subframe #3, and the timing sequence interval k=6;

if both uplink subframes #2 and #4 are taken as the uplink relay subframes used for uplink data transmission, the downlink relay subframes are the downlink subframes #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #9 is taken as the downlink relay subframe having the fixed timing sequence relationship with the uplink subframe #4, and the timing sequence interval k=5;

if both uplink subframes #3 and #4 are taken as the uplink relay subframes used for uplink data transmission, the downlink relay subframes are the downlink subframes #7 and #8, wherein: the downlink subframe #7 is taken as the downlink relay subframe having the fixed timing sequence relationship with the uplink subframe #3, and the downlink subframe #8 is taken as the downlink relay subframe having the fixed timing sequence relationship with the uplink subframe #4, and the timing sequence interval k=4;

if both uplink subframes #3 and #4 are taken as the uplink relay subframes used for uplink data transmission, the downlink relay subframes are the downlink subframes #7 and #9, or #8 and #9, or #7, #8 and #9, wherein: the downlink subframe #7 or #8 is taken as the downlink relay subframe having the fixed timing sequence relationship with the uplink subframe #3, and the timing sequence interval k=4 or 5; the downlink subframe #9 is taken as the downlink relay subframe having the fixed timing sequence relationship with the uplink subframe #4, and the timing sequence interval k=5;

when the wireless frame adopts the uplink and downlink configuration 4, if the uplink subframe #2 is taken as the uplink relay subframe for uplink data transmission, the downlink subframe #8 is taken as the downlink relay subframe having the fixed timing sequence relationship therewith, wherein the timing sequence interval k=6; if the uplink subframe #3 is taken as the uplink relay subframe, the downlink subframe #9 is taken as the downlink relay subframe having the fixed timing sequence relationship therewith, wherein the timing sequence interval k=6;

when the wireless frame adopts the uplink and downlink configuration 6, if the uplink subframe #4 is taken as the uplink relay subframe for uplink data transmission, the downlink subframe #9 is taken as the downlink relay subframe having the fixed timing sequence relationship therewith, wherein the timing sequence interval k=5.

In the above examples, the downlink feedback performed by the relay link may be indicated by the NDI (New Data Indication) in the uplink grant (UL grant) on the relay link. If the UL grant schedules 1 code stream in uplink transmission, the NDI in the UL grant is 1 bit, and the value may be 0 and 1; if the UL grant schedules 2 code streams in uplink transmission, the NDI in the UL grant is 2 bits, each bit corresponds to one code stream, and the value may be 0 and 1. If NDI is used for indication, NDI does not directly represent ACK or NACK information, but represents with 1 bit whether the one code stream scheduled in the uplink is retransmitted or firstly transmitted. If the retransmission is scheduled, it represents that the transmission of the last time is wrong (NACK), otherwise, it represents that the transmission of the last time is correct (ACK). The specific use of NDI is the same as the NDI in the UL grant sent to the UE, and thus will not be repeated here.

The relay station downlink feedback may also be transmitted through an HARQ indication of the relay link, and the HARQ indication is generally borne on the PHICH (Physical HARQ Indicator Channel) of the relay link. The PHICH of the relay link may adopt the same processing mode as the PHICH for transmission to the UE, which will not be described here in detail.

In conclusion, the HARQ transmission method of a relay link described in the embodiments of the present invention efficiently ensures the reliability of relay link data transmission, guarantees the efficiency of HARQ transmission, and meanwhile avoids the influence on the HARQ timing sequence of the subordinate UE of the relay station, and ensures the backward compatibility for the terminal.

The above examples are only preferred examples of the present invention, and are not used to limit the present invention. For a person having ordinary skill in the art, the present invention may have various modifications and changes. Any modification, equivalent substitution and improvement made within the spirit and principle of the present invention shall fall within the scope of the claims of the present invention.

INDUSTRIAL APPLICABILITY

The present invention discloses a Time Division Dual (TDD) system and a downlink feedback method for a relay link thereof to solve the problem of timing sequence relationship when uplink data transmission and downlink feedback are performed using the relay subframes. In the Time Division Dual (TDD) system and a downlink feedback method for a relay link thereof, the timing relationship between uplink transmission and downlink feedback in the relay link is configured reasonably, thereby ensuring the uplink data transmission and downlink Acknowledgement/Non-Acknowledgement (ACK/NACK) information feedback timing sequences, improving the reliability of relay link data transmission, guaranteeing the efficiency of HARQ transmission, avoiding the influence on the HARQ timing sequence of the subordinate UE of the relay station, and ensuring the backward compatibility for the terminal.

What is claimed is:

1. A downlink feedback method for a relay link in a Time Division Dual (TDD) system, comprising:
   selecting one or more uplink subframes from uplink subframes of a wireless frame as uplink relay subframes used for uplink data transmission, determining a downlink subframe for each uplink relay subframe from downlink subframes of the wireless frame as a downlink relay subframe used for downlink feedback or new data indication, wherein the uplink relay subframe and the downlink relay subframe have a fixed timing sequence relationship;
   a relay station transmitting uplink data to a network side through an uplink relay subframe, and receiving downlink feedback or new data indication from the network side through a downlink relay subframe corresponding to the uplink relay subframe according to the fixed timing sequence relationship,
   wherein, the uplink relay subframe and the downlink relay subframe having a fixed timing sequence relationship means that there is a fixed subframe interval k between the uplink relay subframe and the downlink relay subframe, the downlink relay subframe is a $k^{th}$ subframe after the uplink relay subframe; and
   wherein, when the wireless frame adopts an uplink and downlink configuration 1:
   if only an uplink subframe #8 is selected as the uplink relay subframe for uplink data transmission, the downlink relay subframe is a downlink subframe #4, or downlink subframes #4 and #9; wherein: the downlink subframe #4 is taken as the downlink relay subframe having the fixed timing sequence relationship with the uplink subframe #8, wherein the timing sequence interval k=6;
   if only an uplink subframe #3 is selected as the uplink relay subframe for uplink data transmission, the downlink relay subframe is the downlink subframe #9, or the downlink subframes #4 and #9; wherein: the downlink subframe #9 is taken as the downlink relay subframe having the fixed timing sequence relationship with the uplink subframe #3, wherein the timing sequence interval k=6;
   if the uplink subframes #3 and #8 are selected as the uplink relay subframes for uplink data transmission, the downlink relay subframes are the downlink subframes #4 and #9; wherein, the downlink subframe #4 is taken as the downlink relay subframe having the fixed timing sequence relationship with the uplink subframe #8, and the downlink subframe #9 is taken as the downlink relay subframe having the fixed timing sequence relationship with the uplink subframe #3, wherein the timing sequence interval k=6.

2. The method according to claim 1, wherein,
the uplink relay subframe and the downlink relay subframe are located in a same wireless frame, or the downlink relay subframe is located in a next wireless frame after the wireless frame to which the uplink relay subframe belongs.

3. The method according to claim 1, wherein, when the wireless frame adopts an uplink and downlink configuration 2:
   if an uplink subframe #2 is taken as the uplink relay subframe used for uplink data transmission, the downlink relay subframe is a downlink subframe #8, or #3 and #8, or #4 and #8, or #9 and #8, or #3, #4 and #8, or #3, #9 and #8, or #4, #9 and #8, or #3, #4, #9 and #8, wherein: the downlink subframe #8 is taken as the downlink relay subframe having the fixed timing sequence relationship with the uplink subframe #2, wherein, the timing sequence interval k=6;
   if an uplink subframe #7 is taken as the uplink relay subframe used for uplink data transmission, the downlink relay subframe is a downlink subframe #3, or #3 and #4, or #3 and #8, or #3 and #9, or #3, #4 and #8, or #3, #4 and #9, or #3, #8 and #9, or #3, #4, #8 and #9, wherein: the downlink subframe #3 is taken as the downlink relay subframe having the fixed timing sequence relationship with the uplink subframe #7, wherein, the timing sequence interval k=6;
   if the uplink subframes #2 and #7 are taken as the uplink relay subframes used for uplink data transmission, the downlink relay subframes are the downlink subframes #3 and #8, or #3, #4 and #8, or #3, #8 and #9, or #3, #4, #8 and #9, wherein: the downlink subframe #8 is taken as the downlink relay subframe having the fixed timing sequence relationship with the uplink subframe #2, and the downlink subframe #3 is taken as the downlink relay subframe having the fixed timing sequence relationship with the uplink subframe #7, wherein, the timing sequence interval k=6.

4. The method according to claim 1, wherein, when the wireless frame adopts an uplink and downlink configuration 3:
   if the uplink subframe #2 is taken as the uplink relay subframe used for uplink data transmission, the downlink relay subframe is the downlink subframe #8, or #7 and #8, or #8 and #9, or 7, #8 and #9, wherein: the downlink subframe #8 is taken as the downlink relay subframe having the fixed timing sequence relationship with the uplink subframe #2, wherein, the timing sequence interval k=6;
   if the uplink subframe #3 is taken as the uplink relay subframe used for uplink data transmission, the downlink relay subframe is the downlink subframe #7, or #8, or #9, or #7 and #8, or #7 and #9, or #8 and #9, or #7, #8 and #9, wherein: the downlink subframe #7 or #8 or #9 is taken as the downlink relay subframe having the fixed timing sequence relationship with the uplink subframe #3, wherein, the timing sequence interval k=4, 5 or 6;
   if an uplink subframe #4 is taken as the uplink relay subframe used for uplink data transmission, the downlink relay subframe is the downlink subframe #9, or #7 and #9, or #8 and #9, or #7, #8 and #9, wherein: the downlink subframe #9 is taken as the downlink relay subframe having the fixed timing sequence relationship with the uplink subframe #4, wherein, the timing sequence interval k=5;
   if both uplink subframes #2 and #3 are taken as the uplink relay subframes used for uplink data transmission, the downlink relay subframes are the downlink subframes #7 and #8, or #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #7 or #9 is taken as the downlink relay subframe having the fixed timing sequence relationship with the uplink subframe #3, and the timing sequence interval k=4 or 6;
   if both uplink subframes #2 and #3 are taken as the uplink relay subframes used for uplink data transmission, the downlink relay subframes are the downlink subframes #7 and #9, wherein: the downlink subframe #7 is taken as the downlink relay subframe having the fixed timing sequence relationship with the uplink subframe #2, and the timing sequence interval k=5; the downlink subframe #9 is taken as the downlink relay subframe having the fixed timing sequence relationship with the uplink subframe #3, and the timing sequence interval k=6;
   if both uplink subframes #2 and #4 are taken as the uplink relay subframes used for uplink data transmission, the downlink relay subframes are the downlink subframes #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #9 is taken as the downlink relay subframe having the fixed timing sequence relationship with the uplink subframe #4, and the timing sequence interval k=5;
   if both uplink subframes #3 and #4 are taken as the uplink relay subframes used for uplink data transmission, the downlink relay subframes are the downlink subframes #7 and #8, wherein: the downlink subframe #7 is taken as the downlink relay subframe having the fixed timing sequence relationship with the uplink subframe #3, and the downlink subframe #8 is taken as the downlink relay subframe having the fixed timing sequence relationship with the uplink subframe #4, and the timing sequence interval k=4;
   if both uplink subframes #3 and #4 are taken as the uplink relay subframes used for uplink data transmission, the downlink relay subframes are the downlink subframes #7 and #9, or #8 and #9, or #7, #8 and #9, wherein: the downlink subframe #7 or #8 is taken as the downlink relay subframe having the fixed timing sequence relationship with the uplink subframe #3, and the timing sequence interval k=4 or 5; the downlink subframe #9 is taken as the downlink relay subframe having the fixed timing sequence relationship with the uplink subframe #4, and the timing sequence interval k=5.

5. The method according to claim 1, wherein, when the wireless frame adopts an uplink and downlink configuration 4:
   if only the uplink subframe #2 is taken as the uplink relay subframe for uplink data transmission, the downlink relay subframe is the downlink subframe #8, or #4 and #8, or #7 and #8, or #8 and #9, or #4, #7 and #8, or #4, #8 and #9, or #7, #8 and #9, or #4, #7, #8 and #9, wherein: the downlink subframe #8 is taken as the downlink relay subframe having the fixed timing sequence relationship with the uplink subframe #2, wherein the timing sequence interval k=6;
   if only the uplink subframe #3 is taken as the uplink relay subframe for uplink data transmission, the downlink relay subframe is the downlink subframe #9, or #4 and #9, or #7 and #9, or #8 and #9, or #4, #7 and #9, or #4, #8 and #9, or #7, #8 and #9, or #4, #7, #8 and #9, wherein: the downlink subframe #9 is taken as the downlink relay subframe having the fixed timing sequence relationship with the uplink subframe #3, wherein the timing sequence interval k=6;
   if the uplink subframes #2 and #3 are taken as the uplink relay subframes used for uplink data transmission, the downlink relay subframes are the downlink subframes #4, #8 and #9, or #7, #8 and #9, or #4, #7, #8 and #9, wherein: the downlink subframe #8 is taken as the downlink relay subframe having the fixed timing sequence relationship with the uplink subframe #2, and the downlink subframe #9 is taken as the downlink relay subframe having the fixed timing sequence relationship with the uplink subframe #3, wherein the timing sequence interval k=6.

6. The method according to claim 1, wherein, when the wireless frame adopts an uplink and downlink configuration 6:
   if the uplink subframe #4 is taken as the uplink relay subframe used for uplink data transmission, the downlink relay subframe is the downlink subframe #9, and the downlink subframe #9 is taken as the downlink relay subframe having the fixed timing sequence relationship with the uplink subframe #4, wherein the timing sequence interval k=5.

7. A time division dual system, comprising: a relay station, which communicates with a network side through relay subframes,
   the relay station is configured to transmit uplink data to the network side through an uplink relay subframe, and receive downlink feedback or new data indication from the network side through a downlink relay subframe corresponding to the uplink relay subframe; wherein, the uplink relay subframe is one or more uplink subframes selected from uplink subframes of the wireless frame for uplink data transmission; the downlink relay subframe is a downlink subframe selected from downlink subframes of the wireless frame for downlink feedback or new data indication; each uplink relay subframe corresponds to a downlink relay subframe having a fixed timing sequence relationship therewith, wherein, each uplink relay subframe corresponding to a downlink relay subframe having a fixed timing sequence relationship therewith means that there is a fixed subframe interval k between the uplink relay subframe and the downlink relay subframe, the downlink relay subframe is a $k^{th}$ subframe after the uplink relay subframe; and wherein, when the wireless frame adopts an uplink and downlink configuration 1:

if only an uplink subframe #8 is selected as the uplink relay subframe for uplink data transmission, the downlink relay subframe is a downlink subframe #4, or downlink subframes #4 and #9; wherein: the downlink subframe #4 is taken as the downlink relay subframe having the fixed timing sequence relationship with the uplink subframe #8, wherein the timing sequence interval k=6;

if only an uplink subframe #3 is selected as the uplink relay subframe for uplink data transmission, the downlink relay subframe is the downlink subframe #9, or the downlink subframes #4 and #9; wherein: the downlink subframe #9 is taken as the downlink relay subframe having the fixed timing sequence relationship with the uplink subframe #3, wherein the timing sequence interval k=6;

if the uplink subframes #3 and #8 are selected as the uplink relay subframes for uplink data transmission, the downlink relay subframes are the downlink subframes #4 and #9;

wherein, the downlink subframe #4 is taken as the downlink relay subframe having the fixed timing sequence relationship with the uplink subframe #8, and the downlink subframe #9 is taken as the downlink relay subframe having the fixed timing sequence relationship with the uplink subframe #3, wherein the timing sequence interval k=6.

8. The time division dual system according to claim 7, wherein, the uplink relay subframe and the downlink relay subframe are located in a same wireless frame, or the downlink relay subframe is located in a next wireless frame after the wireless frame to which the uplink relay subframe belongs.

9. The time division dual system according to claim 7, wherein, when the wireless frame adopts an uplink and downlink configuration 1, if an uplink subframe #8 is taken as the uplink relay subframe for uplink data transmission, a downlink subframe #4 is taken as the downlink relay subframe having the fixed timing sequence relationship therewith, wherein the timing sequence interval k=6; if an uplink subframe #3 is taken as the uplink relay subframe, a downlink subframe #9 is taken as the downlink relay subframe having the fixed timing sequence relationship therewith, wherein the timing sequence interval k=6;

when the wireless frame adopts an uplink and downlink configuration 2, if an uplink subframe #2 is taken as the uplink relay subframe for uplink data transmission, a downlink subframe #8 is taken as the downlink relay subframe having the fixed timing sequence relationship therewith, wherein the timing sequence interval k=6; if an uplink subframe #7 is taken as the uplink relay subframe, a downlink subframe #3 is taken as the downlink relay subframe having the fixed timing sequence relationship therewith, wherein the timing sequence interval k=6;

when the wireless frame adopts an uplink and downlink configuration 3, if the uplink subframe #2 is taken as the uplink relay subframe used for uplink data transmission, the downlink relay subframe is the downlink subframe #8, or #7 and #8, or #8 and #9, or 7, #8 and #9, wherein: the downlink subframe #8 is taken as the downlink relay subframe having the fixed timing sequence relationship with the uplink subframe #2, wherein, the timing sequence interval k=6;

if the uplink subframe #3 is taken as the uplink relay subframe used for uplink data transmission, the downlink relay subframe is the downlink subframe #7, or #8, or #9, or #7 and #8, or #7 and #9, or #8 and #9, or #7, #8 and #9, wherein: the downlink subframe #7 or #8 or #9 is taken as the downlink relay subframe having the fixed timing sequence relationship with the uplink subframe #3, wherein, the timing sequence interval k=4, 5 or 6;

if an uplink subframe #4 is taken as the uplink relay subframe used for uplink data transmission, the downlink relay subframe is the downlink subframe #9, or #7 and #9, or #8 and #9, or #7, #8 and #9, wherein: the downlink subframe #9 is taken as the downlink relay subframe having the fixed timing sequence relationship with the uplink subframe #4, wherein, the timing sequence interval k=5;

if both uplink subframes #2 and #3 are taken as the uplink relay subframes used for uplink data transmission, the downlink relay subframes are the downlink subframes #7 and #8, or #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #7 or #9 is taken as the downlink relay subframe having the fixed timing sequence relationship with the uplink subframe #3, and the timing sequence interval k=4 or 6;

if both uplink subframes #2 and #3 are taken as the uplink relay subframes used for uplink data transmission, the downlink relay subframes are the downlink subframes #7 and #9, wherein: the downlink subframe #7 is taken as the downlink relay subframe having the fixed timing sequence relationship with the uplink subframe #2, and the timing sequence interval k=5; the downlink subframe #9 is taken as the downlink relay subframe having the fixed timing sequence relationship with the uplink subframe #3, and the timing sequence interval k=6;

if both uplink subframes #2 and #4 are taken as the uplink relay subframes used for uplink data transmission, the downlink relay subframes are the downlink subframes #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #9 is taken as the downlink relay subframe having the fixed timing sequence relationship with the uplink subframe #4, and the timing sequence interval k=5;

if both uplink subframes #3 and #4 are taken as the uplink relay subframes used for uplink data transmission, the downlink relay subframes are the downlink subframes #7 and #8, wherein: the downlink subframe #7 is taken as the downlink relay subframe having the fixed timing sequence relationship with the uplink subframe #3, and the downlink subframe #8 is taken as the downlink relay subframe having the fixed timing sequence relationship with the uplink subframe #4, and the timing sequence interval k=4;

if both uplink subframes #3 and #4 are taken as the uplink relay subframes used for uplink data transmission, the downlink relay subframes are the downlink subframes #7 and #9, or #8 and #9, or #7, #8 and #9, wherein: the downlink subframe #7 or #8 is taken as the downlink relay subframe having the fixed timing sequence relationship with the uplink subframe #3, and the timing sequence interval k=4 or 5; the downlink subframe #9 is taken as the downlink relay subframe having the fixed timing sequence relationship with the uplink subframe #4, and the timing sequence interval k=5;

when the wireless frame adopts an uplink and downlink configuration 4, if the uplink subframe #2 is taken as the uplink relay subframe for uplink data transmission, the downlink subframe #8 is taken as the downlink relay subframe having the fixed timing sequence relationship therewith, wherein the timing sequence interval k=6; if the uplink subframe #3 is taken as the uplink relay subframe, the downlink subframe #9 is taken as the downlink relay subframe having the fixed timing sequence relationship therewith, wherein the timing sequence interval k=6;

when the wireless frame adopts an uplink and downlink configuration 6, if the uplink subframe #4 is taken as the uplink relay subframe for uplink data transmission, the downlink subframe #9 is taken as the downlink relay subframe having the fixed timing sequence relationship therewith, wherein the timing sequence interval k=5.

10. A relay station, comprising:

a transmitting unit, which is configured to transmit uplink data to a network side through an uplink relay subframe; and a receiving unit, which is configured to receive downlink feedback or new data indication from the network side through a downlink relay subframe corresponding to the uplink relay subframe;

wherein, the uplink relay subframe is one or more uplink subframes selected from uplink subframes of the wireless frame for uplink data transmission; the downlink relay subframe is a downlink subframe selected from downlink subframes of the wireless frame for downlink feedback or new data indication; each uplink relay subframe corresponds to a downlink relay subframe having a fixed timing sequence relationship therewith, wherein, each uplink relay subframe corresponding to a downlink relay subframe having a fixed timing sequence relationship therewith means that each uplink relay subframe corresponds to a downlink relay subframe having a fixed subframe interval k therewith, and the downlink relay subframe is a $k^{th}$ subframe after the uplink relay subframe; and wherein, when the wireless frame adopts an uplink and downlink configuration 1:

if only an uplink subframe #8 is selected as the uplink relay subframe for uplink data transmission, the downlink relay subframe is a downlink subframe #4, or downlink subframes #4 and #9; wherein: the downlink subframe #4 is taken as the downlink relay subframe having the fixed timing sequence relationship with the uplink subframe #8, wherein the timing sequence interval k=6;

if only an uplink subframe #3 is selected as the uplink relay subframe for uplink data transmission, the downlink relay subframe is the downlink subframe #9, or the downlink subframes #4 and #9; wherein: the downlink subframe #9 is taken as the downlink relay subframe having the fixed timing sequence relationship with the uplink subframe #3, wherein the timing sequence interval k=6;

if the uplink subframes #3 and #8 are selected as the uplink relay subframes for uplink data transmission, the downlink relay subframes are the downlink subframes #4 and #9; wherein, the downlink subframe #4 is taken as the downlink relay subframe having the fixed timing sequence relationship with the uplink subframe #8, and the downlink subframe #9 is taken as the downlink relay subframe having the fixed timing sequence relationship with the uplink subframe #3, wherein the timing sequence interval k=6.

11. The relay station according to claim 10, wherein, the uplink relay subframe and the downlink relay subframe are located in a same wireless frame, or the downlink relay subframe is located in a next wireless frame after a wireless frame to which the uplink relay subframe belongs.

12. The relay station according to claim 10, wherein, when the wireless frame adopts an uplink and downlink configuration 1, if an uplink subframe #8 is taken as the uplink relay subframe for uplink data transmission, a downlink subframe #4 is taken as the downlink relay subframe having the fixed timing sequence relationship therewith, wherein the timing sequence interval k=6; if an uplink subframe #3 is taken as the uplink relay subframe, a downlink subframe #9 is taken as the downlink relay subframe having the fixed timing sequence relationship therewith, wherein the timing sequence interval k=6;

when the wireless frame adopts an uplink and downlink configuration 2, if an uplink subframe #2 is taken as the uplink relay subframe for uplink data transmission, a downlink subframe #8 is taken as the downlink relay subframe having the fixed timing sequence relationship therewith, wherein the timing sequence interval k=6; if an uplink subframe #7 is taken as the uplink relay subframe, a downlink subframe #3 is taken as the downlink relay subframe having the fixed timing sequence relationship therewith, wherein the timing sequence interval k=6;

when the wireless frame adopts an uplink and downlink configuration 3, if the uplink subframe #2 is taken as the uplink relay subframe used for uplink data transmission, the downlink relay subframe is a downlink subframe #8, or #7 and #8, or #8 and #9, or 7, #8 and #9, wherein: the downlink subframe #8 is taken as the downlink relay subframe having the fixed timing sequence relationship with the uplink subframe #2, wherein, the timing sequence interval k=6;

if the uplink subframe #3 is taken as the uplink relay subframe used for uplink data transmission, the downlink relay subframe is the downlink subframe #7, or #8, or #9, or #7 and #8, or #7 and #9, or #8 and #9, or #7, #8 and #9, wherein: the downlink subframe #7 or #8 or #9 is taken as the downlink relay subframe having the fixed timing sequence relationship with the uplink subframe #3, wherein, the timing sequence interval k=4, 5 or 6;

if an uplink subframe #4 is taken as the uplink relay subframe used for uplink data transmission, the downlink relay subframe is the downlink subframe #9, or #7 and #9, or #8 and #9, or #7, #8 and #9, wherein: the downlink subframe #9 is taken as the downlink relay subframe having the fixed timing sequence relationship with the uplink subframe #4, wherein, the timing sequence interval k=5;

if both uplink subframes #2 and #3 are taken as the uplink relay subframes used for uplink data transmission, the downlink relay subframes are the downlink subframes #7 and #8, or #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #7 or #9 is taken as the downlink relay subframe having the fixed timing sequence relationship with the uplink subframe #3, and the timing sequence interval k=4 or 6;

if both uplink subframes #2 and #3 are taken as the uplink relay subframes used for uplink data transmission, the downlink relay subframes are the downlink subframes #7 and #9, wherein: the downlink subframe #7 is taken as the downlink relay subframe having the fixed timing sequence relationship with the uplink subframe #2, and the timing sequence interval k=5; the downlink subframe #9 is taken as the downlink relay subframe having the fixed timing sequence relationship with the uplink subframe #3, and the timing sequence interval k=6;

if both uplink subframes #2 and #4 are taken as the uplink relay subframes used for uplink data transmission, the downlink relay subframes are the downlink subframes #8 and #9, or #7, #8 and #9, wherein: the downlink subframe #8 is taken as the downlink relay subframe having the fixed timing sequence relationship with the uplink subframe #2, and the timing sequence interval k=6; the downlink subframe #9 is taken as the downlink relay subframe having the fixed timing sequence relationship with the uplink subframe #4, and the timing sequence interval k=5;

if both uplink subframes #3 and #4 are taken as the uplink relay subframes used for uplink data transmission, the downlink relay subframes are the downlink subframes #7 and #8, wherein: the downlink subframe #7 is taken as the downlink relay subframe having the fixed timing sequence relationship with the uplink subframe #3, and the downlink subframe #8 is taken as the downlink relay subframe having the fixed timing sequence relationship with the uplink subframe #4, and the timing sequence interval k=4;

if both uplink subframes #3 and #4 are taken as the uplink relay subframes used for uplink data transmission, the downlink relay subframes are the downlink subframes #7 and #9, or #8 and #9, or #7, #8 and #9, wherein: the downlink subframe #7 or #8 is taken as the downlink relay subframe having the fixed timing sequence relationship with the uplink subframe #3, and the timing sequence interval k=4 or 5; the downlink subframe #9 is taken as the downlink relay subframe having the fixed timing sequence relationship with the uplink subframe #4, and the timing sequence interval k=5;

when the wireless frame adopts an uplink and downlink configuration 4, if the uplink subframe #2 is taken as the uplink relay subframe for uplink data transmission, the downlink subframe #8 is taken as the downlink relay subframe having the fixed timing sequence relationship therewith, wherein the timing sequence interval k=6; if the uplink subframe #3 is taken as the uplink relay subframe, the downlink subframe #9 is taken as the downlink relay subframe having the fixed timing sequence relationship therewith, wherein the timing sequence interval k=6;

when the wireless frame adopts an uplink and downlink configuration 6, if the uplink subframe #4 is taken as the uplink relay subframe for uplink data transmission, the downlink subframe #9 is taken as the downlink relay subframe having the fixed timing sequence relationship therewith, wherein the timing sequence interval k=5.

* * * * *